April 12, 1932.　　　E. ASCHENBACH　　　1,854,094
GAUGE
Filed Feb. 26, 1929
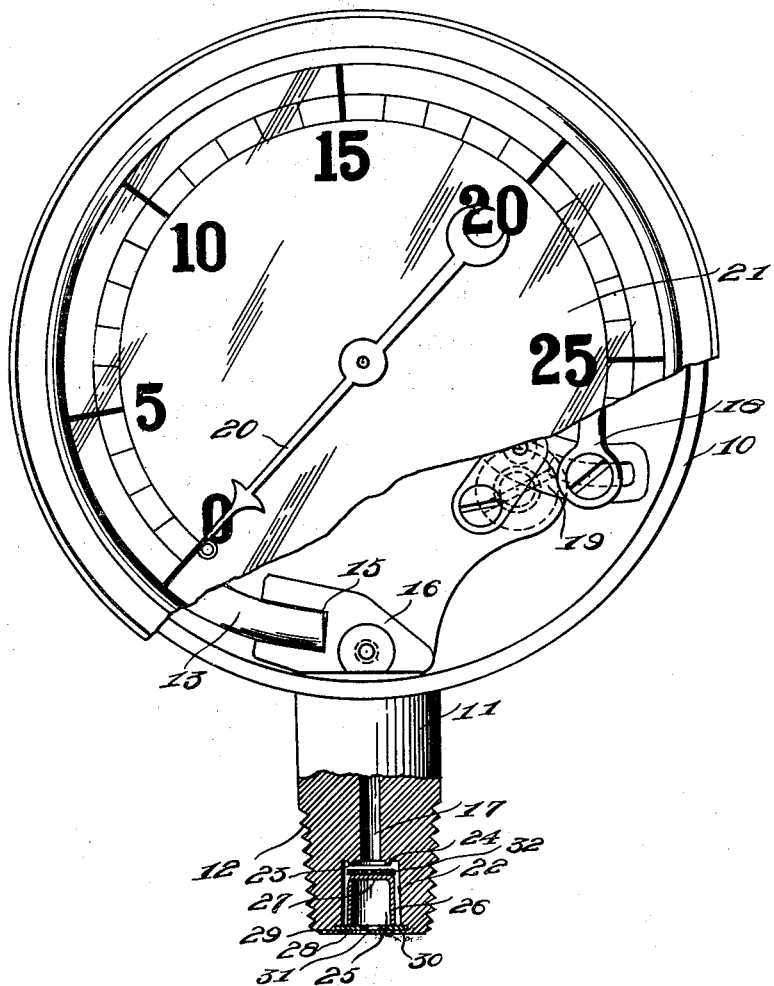
Inventor
Emerson Aschenbach
By Strauch & Hoffman
Attorney Patented Apr. 12, 1932

1,854,094

UNITED STATES PATENT OFFICE

EMERSON ASCHENBACH, OF SELLERSVILLE, PENNSYLVANIA, ASSIGNOR TO UNITED STATES GAUGE COMPANY, OF NEW YORK, N. Y., A CORPORATION OF PENNSYLVANIA

GAUGE

Application filed February 26, 1929. Serial No. 342,862.

This invention relates to measuring instruments such as gauges, designed for the measuring of fluid pressures, that are subject to possible substantial abrupt fluctuations beyond the range of pressures provided for in the design of the gauge.

Instruments designed for the purpose of measuring as well as indicating or registering fluid pressures are frequently applied in situations in which the instrument may be accidentally or inadvertently subjected to sudden abnormal pressures far beyond the capacity of the instrument to successfully withstand. Unless special provision is made to check the application of such abnormal pressures to the relatively delicate mechanism of the gauge damage may be caused to said mechanism, or it may be rendered unfit for further use. If the instrument is merely damaged by such abnormal pressure the damage thereto usually manifests itself in inaccurate readings of the instrument.

Attempts have heretofore been made to prevent the damage or destruction of measuring instruments, when through accident or misuse they are subjected to pressures far beyond their capacity. Such of the prior attempts heretofore made that are feasible in practice, require especially constructed arrangements that can be manufactured only at a relatively high cost. Other constructions heretofore proposed have been only partially successful, due to the fact that the means provided to prevent the application of the abnormal pressures to the instrument are not certain to be effective under all conditions, or, if effective under all conditions have interfered with the accuracy of the reading of the instrument when it is serving its normal purpose.

This invention aims to avoid the objections inherent in prior constructions proposed for the same purpose, by providing an extremely simple automatically operating means for preventing the application of abnormal or excessive pressures to the parts of a measuring instrument; which means will operate with a degree of certainty heretofore unattained and without introducing into the measuring instrument any elements that will prevent the accurate registering or recording of the pressures when the instrument is operating under normal conditions.

A primary object of the invention is to provide a gauge of an extremely simple construction including means for automatically checking abnormal pressures, which means may be added to an instrument without substantially increasing the cost thereof but that will at the same time be thoroughly effective in serving the purpose for which it is provided.

A further object of the invention is to provide a means for automatically checking the flow of fluids under explosive or other abruptly created abnormal pressures to measuring instruments, in which the checking means is positively and firmly seated upon a valve seat provided for its reception and so arranged as to provide a tight joint against such pressures, thus completely preventing access of such pressures to the relatively delicate parts of the instrument.

A still further object of the invention is to provide a check for a measuring instrument in the form of a cup-shaped member arranged so that the cup in said member opens in the direction in which the pressure is applied to the instrument, in which cup the abnormal or unusual pressures will automatically build up causing the valve carried by said member to be positively and promptly forced upon its seat.

A still further object of the invention is to provide a check for a measuring instrument, such as a gauge in which the check is made up of extremely simple and inexpensive sheet metal parts associated with the instrument by merely inserting said parts in an open recess in the stem or similar portion of the gauge.

Still further objects of the invention will appear as a description thereof proceeds with reference to the accompanying drawing, in which:

The figure is a front elevational view partially broken away of a gauge of the Bourdon type selected for illustrating a preferred application of the invention in issue.

This invention is intended for use particularly in connection with a pressure gauge embodying a Bourdon tube, though it will be understood that the invention may be applied to a pressure measuring instrument of any type to provide a barrier preventing the access of fluids under abruptly applied abnormal, excessive or explosive pressures to the relatively delicate measuring elements of the instrument. In said figure the numeral 10 indicates the casing of such a pressure gauge. Said casing is secured to a stem or projection 11 in any suitable manner, the end of the stem being threaded externally as shown at 12, so that it may be conveniently screwed in any socket provided to receive it. Said socket may be a part of any fluid system subjected to the pressures to be measured by the instrument. The casing 10 houses the mechanism of the gauge, said mechanism comprising, generally, a Bourdon tube 13 one end of which is secured in a socket 15 provided in an element 16 arranged within said casing. In accordance with the usual practice, the end of the Bourdon tube 13 is in communication with a passage or bore 17 extending centrally longitudinally through the stem or projection 11, and through which the pressures are communicated to said Bourdon tube.

The opposite end of the Bourdon tube 13, indicated by the numeral 18, is free to move in accordance with the variations of pressure in the fluid in said tube. Said free end 18 is connected by suitable mechanism, indicated generally by the numeral 19 on the drawing, to a shaft that carries a pointer or indicator 20 that is caused to move over a dial 21 disposed so as to close one side of the casing. The dial 21 is secured to said casing in any approved manner. The mechanism so far described, constitutes no part of the present invention, which may be applied equally well to gauges of other types having other means, than those illustrated in the drawing, for causing the operation of the indicator hand 20 in accordance with fluctuations of pressure of the fluid in the system to which the gauge may be applied.

Gauges of the type just described are applied to a multiplicity of diverse uses. For example, such gauges are applied to indicate the pressure of gases being supplied to a burner. When applied to such use, it frequently happens that the gauge is subjected to abruptly applied, abnormal and excessive pressures, caused by the backfiring of the gas from the burner. Such backfiring subjects the fluid system to a sudden and abrupt surge of pressure of an explosive character, which pressure, if applied to the gauge, tends to damage or even destroy it.

In order to avoid such damage or destruction of the gauge the stem or projection 11 is provided with an open bore or socket 22 in communication with the bore 17 before referred to. As clearly shown on the drawings the socket 22 is of a diameter exceeding that of the bore 17 and a shoulder is provided by the enlarged diameter of the socket 22 said shoulder forming a valve seat 23. The valve seat 23 is, preferably, shaped in the form of an annular rib 24 cooperating with a washer or gasket, presently to be described and providing a means for maintaining a tight joint when the valve, about to be referred to, is forced to its seat.

Disposed within the socket or recess 22 is a valve member 25, which, in the preferred form of the invention, is in the form of a cup that is shaped by die shaping or otherwise, from sheet metal, providing a construction that is extremely inexpensive to produce. This preferred construction is illustrated in the drawing, the annular wall of the cup being designated by the numeral 26 and the bottom thereof by the numeral 27. The valve member 25 is retained within the recess or socket 22 by means of a sheet metal disk 28 seated in a recess 29 formed the end of the projection 11. The disk 28 is held in place by peening over the edges 30 of the metal surrounding the recess provided to receive it, as clearly shown on the drawing. Said disk may be secured in any other manner, as by screw threads. The disk 28 is provided with an aperture 31 of relatively small diameter through which the fluid enters the stem or projection 11 of the gauge. The diameter of the aperture 31 is substantially less than the inside diameter of the cup-shaped valve 25 for a purpose later to be described. Secured externally to the base 27 of the cup-shaped valve member is a gasket or washer 32 in the form of a disk. This gasket or washer may or may not be used as may be desired. If the gasket is not used the valve 25 directly engages the annular projection 24 of the valve seat. The cup-shaped valve 25 fits loosely into the recess 22 as clearly shown in the drawing, so that an annular chamber is provided around said valve through which the fluid may pass to reach the pressure gauge.

In operation, fluid under the pressure enters the aperture 31 of the disk 28 entering the open end of the cup-shaped valve and lifting it from engagement with the inner face of the disk 28. The fluid then flows around the edges of said cup and into the bore 17 and from said bore to the Bourdon tube of the gauge, assuming that the pressures are normal and of the degree for which the instrument is designed. Under these conditions, the valve 25 floats in the chamber in which it is mounted when changes within the designed capacity of the gauge occur and its presence has no effect upon the operation of the gauge under these conditions. However, if the fluid is subjected to a suddenly applied abnormal variation in pressure, such as would be caused by backfiring from a gas burner, the fluid under such abnormal pressure enters the aperture 31 and immediately builds up in the cup provided in the valve member 25. A substantial pressure is created in the cup, due to the fact that a relatively long tortuous course is provided for the escape of the fluid from the inside of said cup around the edge and between the outer sides of said cup and the walls of the bore 22. Such pressure causes the cup to be firmly seated upon the valve seat 23 bringing the gasket 32 into firm engagement with said seat and positively and automatically preventing the fluid under pressure from entering the bore 17 of the gauge. The cup will remain in this position until the normal pressures are again re-established in the system, when the valve 25 will leave its seat and thus automatically restore the gauge to its normal operating condition. It will be observed that, in view of the cup-shaped form of the valve 25, abnormal pressures will positively cause the valve to be seated as soon as abnormal conditions arise. The effectiveness of the action is increased by virtue of the fact that the aperture 31 in the plate 28 is of a diameter less than the inside diameter of the cup-shaped valve. The fluid is thus caused to enter the cup and be impinged against the bottom and deflected around the edges of the cup before it can enter bore 17, so that the fluid must follow a tortuous course in escaping to the gauge around the edges of the cup. The valve will seat before the fluid can, under these conditions, enter the bore 17, and the pressure within the cup insures the firm seating of the valve when sudden impulses of pressure beyond the capacity of the gauge arise in the system to which it is applied.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range or equivalency of the claims are therefore intended to be embraced therein.

What I claim and desire to secure by U. S. Letters Patent is:

1. In combination with a pressure gauge, of means to automatically prevent abnormal pressures from substantially affecting said gauge, comprising a valve in the form of a cup having a closed bottom and having its open end facing toward the source of pressure, a valve seat outside said cup valve, the closed bottom of said valve arranged to cooperate with said valve seat to prevent abnormal pressures from reaching said gauge.

2. A pressure gauge including a stem provided with means for attachment to a system subject to fluctuations in pressure, said stem being provided with a bore in communication with said gauge and with a recess formed in the end of said stem of a diameter larger than the diameter of said bore, thus providing an annular valve seat at the junction of said bore and recess, a valve arranged in said recess in position to be moved toward said seat when the gauge is subjected to abnormal pressures, and separate means to close the open end of said recess to maintain said valve therein, said means being provided with an aperture of substantially smaller diameter than the diameter of said valve.

3. The combination defined in claim 2 in which said valve comprises a sheet metal member in the form of a cup, the open end of the cup facing toward said last named aperture.

4. The combination defined in claim 2 in which said last named means is seated in a further recess in an end of said stem and consists of a disk set into said recess and held therein by peening the end of said stem around said recess over the edge of said disk.

5. A pressure gauge comprising a stem by which said gauge may be attached to a system containing fluid under pressure, said stem being provided with a longitudinally extending bore whereby the pressure in said system is brought into communication with said gauge, a recess being formed in the end of said stem, a valve floatingly mounted in said recess and an apertured plate disposed in the end of said stem and partially closing said recess and retaining said valve therein.

6. A pressure gauge of the Bourdon type comprising a stem by which said gauge may be attached to a system containing fluid under pressure, said stem being provided with a longitudinal bore arranged to communicate with the Bourdon tube of said gauge and with a recess in the end of said stem of a diameter substantially larger than the diameter of said bore, providing an annular shoulder formed to provide a valve seat, a sheet metal valve arranged in said recess, said valve being constructed in the form of a cup arranged in said recess with the open end thereof facing away from said bore, and with the bottom of said cup arranged to cooperate with said valve seat said cup being loosely mounted in said bore so that it may float therein, and a separate disk provided with an aperture in substantial alinement with said bore when the disk is in position, said disk being attached to the end of said stem so that it partially closes the end of said recess and retains said valve within said recess.

In testimony whereof I affix my signature.

EMERSON ASCHENBACH.